United States Patent [19]

Burns et al.

[11] Patent Number: 5,626,764
[45] Date of Patent: May 6, 1997

[54] CONTINUOUS MULTICOMPONENT FOCUSING IN A MAGNETICALLY STABILIZED FLUIDIZED BED

[75] Inventors: Mark A. Burns; Lisa L. Evans, both of Ann Arbor, Mich.

[73] Assignee: The Board of Regents acting for and on the behalf of the University of Michigan, Ann Arbor, Mich.

[21] Appl. No.: 355,817

[22] Filed: Dec. 14, 1994

Related U.S. Application Data

[63] Continuation of Ser. No. 167,620, Dec. 14, 1993, abandoned, which is a continuation of Ser. No. 795,905, Nov. 15, 1991, abandoned.

[51] Int. Cl.⁶ .................................................. B01D 15/04
[52] U.S. Cl. ............................ 210/661; 210/679; 210/695
[58] Field of Search .................................... 210/661, 662, 210/679, 695, 222, 223, 268, 743

[56] References Cited

U.S. PATENT DOCUMENTS

| | | | |
|---|---|---|---|
| 3,607,740 | 9/1971 | Akeroyd | 210/679 |
| 4,115,927 | 9/1978 | Rosensweig | 34/1 |
| 4,284,511 | 8/1981 | Weitzen et al. | 210/679 |
| 4,443,231 | 4/1984 | Siegell | 55/3 |
| 4,655,796 | 4/1987 | Pirkle, Jr. | 55/3 |
| 4,675,113 | 6/1987 | Graves et al. | 210/635 |
| 4,780,113 | 10/1988 | Koslow | 210/695 |
| 5,084,169 | 1/1992 | Noble et al. | 210/222 |
| 5,084,184 | 1/1992 | Burns | 210/656 |
| 5,167,811 | 12/1992 | Graves et al. | 210/198.2 |
| 5,167,812 | 12/1992 | Graves et al. | 210/198.2 |

OTHER PUBLICATIONS

Burns, et al., "Continuous Affinity Chromatography Using a Magnetically Stabilized Fluidized Bed," Biotechnology Progress, vol. 1, No. 2 (Jun., 1985) pp. 95–103.

Chetty, et al. "Continuous Protein Separations in a Magnetically Stabilized Fluidized Bed Using Nonmagnetic Supports," Biotechnology and Bioengineering, vol. 38, pp. 963–971 (1991).

Chetty et al., "Continuous Protein Separations in a Magnetically Stabilized Fluidized Bed Using Nonmagnetic Supports", Biotechnology and Bioengineering, (Feb. 4, 1991).

Primary Examiner—Ivars Cintins
Attorney, Agent, or Firm—Rohm & Monsanto

[57] ABSTRACT

A device, and process, for continuously separating dissolved solutes and suspended particles from a multicomponent fluid phase in a magnetically stabilized fluidized bed (MSFB). The process is of the type wherein a solid resin and a liquid buffer move countercurrent to each other in the bed. In steady state operation, a time invariant pH gradient will form in the bed and remain spatially fixed. Other condition variables, such as temperature, can be used to form a time invariant gradient provided that equilibrium partition between the solid and liquid phases is a function of the condition variable.

12 Claims, 6 Drawing Sheets

LIQUID: KHC8H4O4, pH = 4.0
SOLID: IRC-50, pH = 7.0

CONTINUOUS MULTICOMPONENT FOCUSING IN A MAGNETICALLY STABILIZED FLUIDIZED BED

GOVERNMENT RIGHTS CLAUSE

This invention was made with government support under Grant #CTS 90-96185 awarded by the National Science Foundation. The government has certain rights in the invention.

This application is a continuation of application Ser. No. 08/167,620 filed on Dec. 14, 1993, now abandoned, which is a continuation of application Ser. No. 07/795,905 filed on Nov. 15, 1991, now abandoned. Both applications being assigned to the assignee hereof.

BACKGROUND OF THE INVENTION

This invention relates generally to a device, and process, for continuously separating solutes and suspended particles from a fluid phase in a magnetically stabilized fluidized bed (MSFB), and more particularly, to a device and process wherein multiple solutes in a fluidizing medium can be retained and concentrated against the action of diffusion and dispersion (i.e., "focused") at specific respective locations within an MSFB by adjusting the binding equilibrium throughout the bed by imposing a stationary property gradient, such as a pH gradient, on the moving bed.

There is a need, particularly in the biotechnology field, for improved product recovery techniques. The separation and purification of product from a typical biochemical reactor can require extensive capital, space, and operation coats. Indeed, separation processes frequently comprise a substantial proportion of the product's cost. Ideally, separation processes should be inexpensive, capable of handling large volumes of liquids and cells or cell debris, and efficient. Conventional techniques for biochemical product recovery typically include filtration or centrifugation to remove any suspended solids followed by a batch separation operation, and, in some cases, an additional purification operation(s). Conventional separation and purification operations are typically performed in chromatography and adsorption (e.g., ion-exchange or affinity) packed columns.

Isoelectric focusing is a known technique for continuously separating solutes from an aqueous solution based on the isoelectric point of the components. In an exemplary process, a mixture of protein molecules is resolved into its components by subjecting the mixture to an electric field in a supporting gel having a previously established pH gradient. The isoelectric point, pI, is the pH value at which the net charge on a molecule in solution is zero. At pI, the molecule will not move in an electric field. The isoelectric focusing technique can be used to focus proteins and amino acids whose pI points differ by less than 0.02 pH units.

The isoelectric focusing technique, however, requires special chemicals, ampholytes, to create the pH gradient and the application of a high-power electric field. The ampholytes must be specially synthesized thereby adding expense to the system. Disadvantageously, the separated solutes may contain contaminants from the ampholytes and other solutes within the aqueous solution. This necessitates at least one additional step to separate the solute from the ampholyte.

An isoelectric focusing device has been devised to obviate the need for ampholytes by using a gel pore size gradient to effect separation. This device also requires an electric field for partial or total solute mobility.

The current used to generate the field in isoelectric focusing systems can create convective mixing. Further, the electric field generates he, at which can adversely affect heat-sensitive solutes. In many cases, a cooling system is required which further increases the complexity and cost of the isoelectric focusing system.

Thus, while isoelectric focusing may produce concentrated solute samples, the high power requirements and heat generation associated with the use of electric fields are major drawbacks. A second technique, chromatofocusing, eliminates the need for the electric field, but suffers from the inability to run continuously or at steady-state. Chromatofocusing systems, however, use simple ion-exchange resins and buffers thereby obviating the need for ampholytes and the complications attendant thereto.

The chromatofocusing technique also separates solutes on the basis of pI. An aqueous solution, buffered to a predetermined pH is introduced into a chromatography column containing an ion-exchange resin at a different pH. As the solution flows through the column, a continually changing pH gradient is formed throughout the column. The pH gradient changes from a value near the exchange resin pit to a near linear gradient between the solution buffer and the exchange resin pH to a final pH equal to the solution buffer. Since both the solution and the exchange resin have some buffering capacity, the movement of any particular pH value through the column is much slower than the movement of the liquid solution phase. This differential motion can be used to focus solutes in the column.

Illustratively, the liquid buffer solution has a very high pH, the column is initially at a very low pH, and the solid ion exchange resin is negatively charged. Solutes introduced with the liquid buffer solution would be negatively charged, and therefore, would be repelled by the ion exchange resin. As the solutes travel down the column, the pH values become lower. Eventually, each solute will reach a region where the pH equals its pI. Beyond this point, the solute will change charge and adsorb on the resin. In this manner, each solute will focus at its particular pI value, slowly move down the column at the velocity of the pH gradient, and elute from the column in a focused pulse at its pI.

For focusing particulates, such as cells, packed columns tend to clog at high cell concentrations. Isoelectric focusing can separate cells, but has the drawbacks of ohmeric heating and high power consumption. A further disadvantage of chromatofocusing is that it is inherently a batch-wise operation. Typically, the efficiency of batch operations is limited by column height and by the necessity of regenerating the adsorbent for use in subsequent operations. All of the foregoing disadvantages are serious drawbacks for large scale commercial operations.

Continuous fixed bed processes have been proposed to compensate for the disadvantages of a stationary column, batch process. However, continuous fixed beds are mechanically complicated and the efficiency is limited by particle size of the adsorbent. Smaller adsorbent particles give better resolution, but result in a large pressure drop across the bed. The pressure drop can be reduced by fluidizing the bed. However, fluidized beds have the disadvantages of backmixing and channel formation.

Magnetically stabilized fluidized beds have been developed to compensate for the aforementioned disadvantages of a fluidized bed. A magnetically stabilized fluidized bed consists of a column or bed packed with solid support particles which are magnetically susceptible. A fluidizing medium, such as a liquid or gas, is introduced into the bed at a velocity sufficient to fluidize the solid particles, i.e., to cause the particles to rapidly mix and act as a fluid phase. The fluid properties of the solids permit them to flow out of the column for regeneration or replacement. Stabilization of the bed with a uniform low-power magnetic field (<10 watts/liter) eliminates the mixing and turbulence effects otherwise observed in a fluidized bed. As soon as the magnetic field is applied, the solid particles stop mixing and remain motionless. The solid particles travel through the bed in smooth plug flow movement. The flow of fluid through a magnetically stabilized fluidized bed is similar to a conventional packed bed.

One drawback of magnetically stabilized fluidized beds is that the magnetically susceptible resins have to be specially synthesized or prepared. It has been discovered that many nonmagnetic resins, such as the ion-exchange resins sold under the trademarks Amberlite® (Rohm and Haas, Philadelphia, Pa.) or Dowex® (The Dow Chemical Company, Midland, Mich.) can be combined with magnetically susceptible solids such as nickel or stainless steel spheres to form a "mixed bed." Stable mixed beds have been formed containing up to about 80% nonmagnetic resin by volume.

Typically, magnetically stabilized fluidized bed processes are limited by the column height, which limits the amount of adsorbent available for separations, and the requirement of a specific adsorbent-desorbent system.

One suggested solution, termed "isomobility focusing," is described in U.S. Pat. No. 4,780,113 to Koslow. Isomobility focusing is defined as the process of selectively concentrating and separating a component of a mixture in a controllably transported MSFB as a result of controlling conditions of the bed such that the movement of a given component of the feedstream in the fluid phase is equal to the movement of that component on the solid phase. If the two phases are moving in opposite directions, the component will have no net velocity, its movement in one phase being equal to its movement in the other phase. Various methods for controlling the process conditions, such as adjusting the chemical or physical properties of the fluid phase, such as pH, temperature, pressure, or salt concentration are suggested. The control of process conditions is uniform over the entire isomobility focusing zone to adjust the affinity of the chemical specie being separated. Thus, isomobility focusing can not concentrate and/or separate multiple components on the same bed.

Further, although isomobility focusing is described using the term "focusing," the product is not concentrated at a given point along the column length, but rather is diluted within the column as the product bandwidth increases.

It is, therefore, an object of this invention to provide a device and process for continuously separating dissolved solutes and suspended particles from a multicomponent fluid phase in a magnetically stabilized fluidized bed.

It is another object of this invention to provide a device and process for continuously separating dissolved solutes and suspended particles in a magnetically stabilized fluidized bed with no cross-contamination of products and/or compounds used in the processing.

It is also an object of this invention to provide a device and process for continuously separating dissolved solutes and suspended particles in a magnetically stabilized fluidized bed using standard adsorption resins and buffers.

It is a further object of this invention to provide a device and process for continuously separating dissolved solutes and suspended particles in a magnetically stabilized fluidized bed without the need for specially prepared adsorbents or amphoteric compounds.

It is additionally an object of this invention to provide a device and process for continuously separating dissolved solutes and suspended particles in a magnetically stabilized fluidized bed without the use of a heat generating electric field.

It is yet a further object of this invention to provide a device and process for continuously separating dissolved solutes and suspended particles in a magnetically stabilized fluidized bed so that both solutes and suspended particles can be focused, i.e., increased to many times their original concentration.

It is also another object of this invention to provide a device and process for continuously separating dissolved solutes and suspended particles in a magnetically stabilized fluidized bed wherein separation time is fast (preferably on the order of minutes).

It is yet an additional object of this invention to provide a device and process for continuously separating dissolved solutes and suspended particles in a magnetically stabilized fluidized bed wherein operation, control and scale-up are simple and relatively inexpensive.

SUMMARY OF THE INVENTION

The foregoing and other objects are achieved by this invention which provides a device, and process, for continuously separating dissolved solutes and suspended particles from a multicomponent fluid phase in a magnetically stabilized fluidized bed. Inert magnetically susceptible spheres, such as stainless steel or nickel spheres, and chemically active resins, such as a Rohm and Haas ion-exchange resin (Amberlite® IR-50), are commingled to form a stabilized bed capable of adsorbing solutes. The process is of the type wherein the solid particles move countercurrent to the flow of a fluidizing medium. Of course, the solid particles may be a single magnetizable adsorbent.

Multiple solutes in the fluidizing medium can be retained and focused (i.e., concentrated against the action of diffusion and dispersion) at specific respective locations within the MSFB, which locations are predetermined by conditions controllably created within the bed. If a solute is repelled by the solid phase, it will move upward through the column with the liquid flow until conditions change and such that it becomes attracted to the solid phase. Then, the solute will adsorb on the solid phase and move down the column with the solid phase. pH, for example, can be used to control the binding of the solute to the solid phase and causes the solute to focus at a particular location in the column: the place where pH is equal to the isoelectric point, pI of the solute.

In an illustrative embodiment, a low pH buffer is injected in one end of the column along with the solid phase and a high pH buffer is injected in the other end along with the fluid phase. A linear pH gradient is established within the column, and maintained in a fixed spatial relationship with respect to column length. Any method of continuously varying a condition in the column as a function of vertical position can be used as long as the resulting varied condition affects the binding equilibrium of the solute. Exemplary condition variables include temperature, salt concentration, and pressure.

Since the chemical properties of each solute are unique, the focusing point for each solute will also be unique, so that multicomponent separations are possible. Thus, multiple solutes can be removed continuously from the column, illustratively by side stream draw-off, at the fixed location established by the pI of the solute in the system.

BRIEF DESCRIPTION OF THE DRAWING

Comprehension of the invention is facilitated by reading the following detailed description, in conjunction with the annexed drawing, in which.

DETAILED DESCRIPTION

Figure 1:
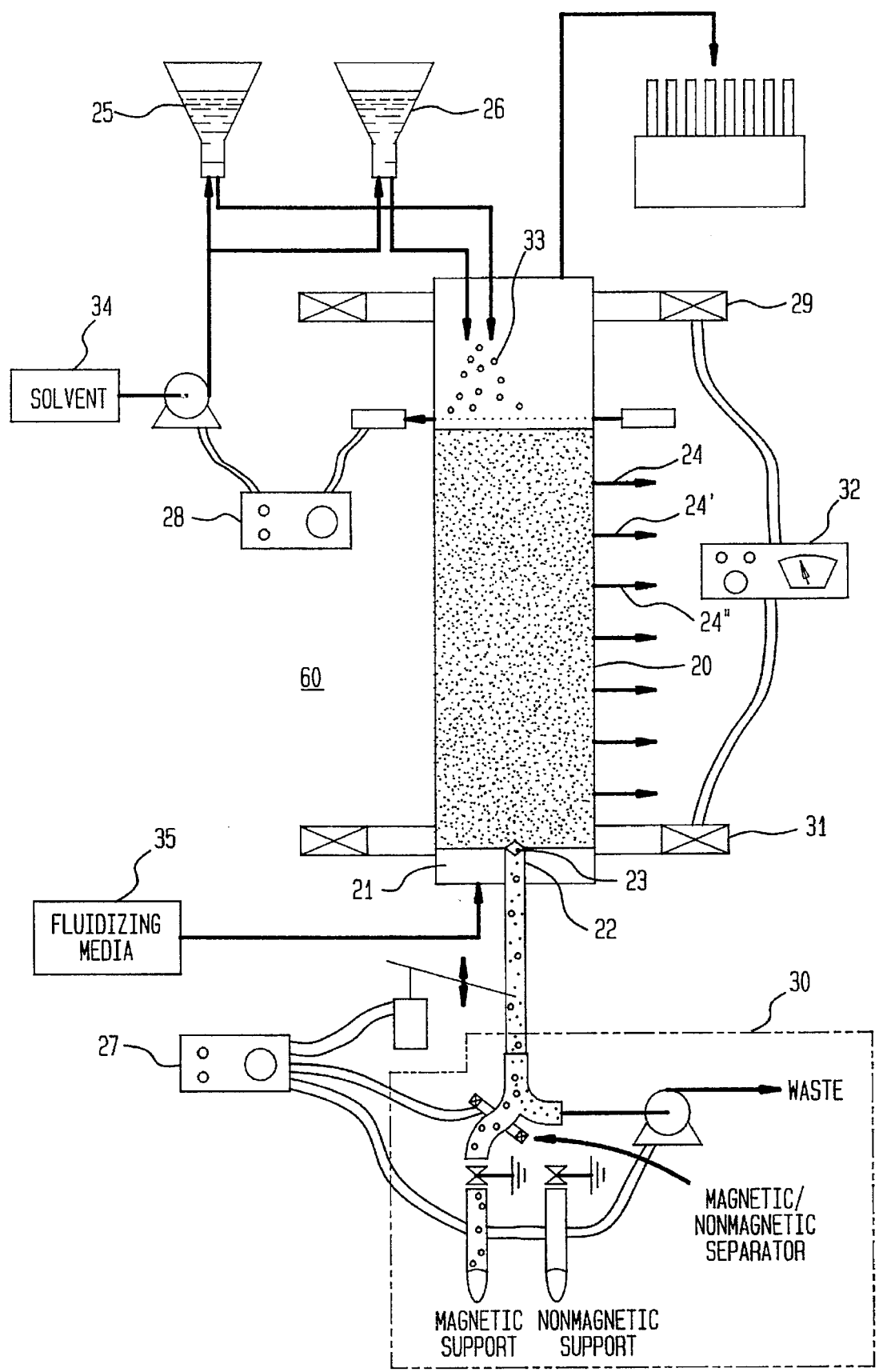
FIG. 1 is a schematic representation of a MSFB device embodiment of the present invention.

FIG. 1 is a schematic representation of a device embodiment of the invention. A column 20, 2 cm in diameter and 30 cm in height, forms the basis of an MSFB 60. A liquid distributor 21 at the base of column 20 distributes incoming liquid across the bottom of the column and supports the solid support media. Proper distribution of liquid at the bottom of the bed facilitates uniform fluidization. In a specific embodiment, liquid distributor 21 is a sheet of porous material, such as porous polyethylene (available from Porex Technologies, Inc., Fairbun, Ga. in pore sizes ranging from 25 to 40 μm). An opening 22 in liquid distributor 21 permits withdrawal of solid support media upon opening of solenoid valve 23.

In this embodiment, the solid support media comprises a mixture of magnetically susceptible particles such as nickel, cobalt, iron, or stainless steel spheres (50–200 μm) and a chemically active non-magnetic resin, such as a commercially available ion-exchange resin (100–500 μm). Table I identifies some exemplary non-magnetic support materials which have been successfully stabilized when admixed with magnetically susceptible particles. In preferred embodiments, the non-magnetic support material is non-porous.

TABLE I

| Separation Technique | Trademark | Diameter (μm) | Density (g/cc) |
|---|---|---|---|
| Affinity | Macrosorb. KAX.CB | wide range | 1.25 |
| | Biorad Affi-gel Blue | 150–300 | 1.05 |
| Ion-Exchange | Macrosorb. KAX.DEAE | wide range | 1.25 |
| | Amberlite IRC-72 | 450 | 1.17 |
| | Amberlite IRC-35 | 490 | N/A |
| | Amberlite IRC-50 | 370 | 1.25 |
| | Amberlite IRC-120 | 500 | 1.26 |
| | Dowex HCR-S | >1190 | 1.28 |
| Other Adsorption | Amberlite XAD-7 | 250–800 | 1.05 |
| | Biorad BioBeads-7 | 300–850 | 1.05 |
| | Biorad BioSil | 75–150 | 1.50 |

In some embodiments, the solid support media may comprise a single magnetically susceptible adsorbent. Acceptable magnetically susceptible adsorbents, such as Magnogel® resin (available from LKB Productor, Bromma sweden), are commercially available. In the alternative, a magnetic calcium alginate gel, for example, may be specially prepared in accordance with techniques known in the art.

Referring to FIG. 1, magnetic spheres and ion-exchange resin are separately introduced into the top of column 20 from magnetic sphere reservoir 25 and ion-exchange resin reservoir 26 at controllable rates by metering pumps (not shown) to form solid support media 33. Buffered solvent 34 is added, in some embodiments, to form a slurry.

The ratio of the magnetic support media to the non-magnetic support media can be controlled by varying the ratio of the flow rates to the two reservoirs. Typical volume ratios are 25% to 50% non-magnetic support media to 50% to 75% magnetic support media. The flow rate of solid support media through the column is controlled by a solenoid valve 23 and solid flow rate controller 27. Bed height controller 28 uses a photosensor to trigger withdrawal of solid support media when the bed height exceeds a predetermined value.

In the mixed bed embodiment, magnetic support media and non-magnetic support media are separated as shown in schematic box 30 and may be analyzed, regenerated and/or reused.

The MSFB is fluidized by contacting the solid support media with a fluid in a countercurrent flow, preferably in an ascending manner against the force of gravity. The flow of fluidizing medium is at a velocity ranging from that required to fluidize the bed to that which will destabilize the bed, or cause backmixing, channeling, or other turbulence. In preferred embodiments, the fluid velocity may range from about 0.01 cm/min. to 1000 cm/min. The fluidizing medium, of course, may be a gas or liquid.

In the specific embodiment of FIG. 1, the fluidizing medium 35 comprises both a liquid buffer and the product-containing feedstream and enters column 20 as a single stream through liquid distributor 21. In certain preferred embodiments, the liquid buffer and the product-containing feedstream enter column 20 through separate inlets.

A uniform magnetic field, which is used to stabilize the bed, is created by a pair of modified Helmholtz coils 29 and 31 (13.7 cm×2.5 cm) connected by magnetic field power supply 32. A low magnetic field on the order of 20–100 gauss, about 5 watts/l, has been found to be sufficient to fluidize the bed while suppressing solids backmixing and preserving staging. Typically, no cooling is required for the successful operation of the system of the present invention.

The magnetic field can be oriented vertically, horizontally, or at any angle of orientation with respect to the column. Further, the magnetic field may be constant or pulsed, AC or DC.

The MSFB has the mass transfer properties of a packed bed and the hydrodynamic properties of a fluidized bed. The stability of the bed is a function of magnetic field strength, fraction of non-magnetic resin, and the liquid velocity. These factors are discussed at length in an article by Chetty and Burns, *Biotechnology and Bioengineering*, Vol. 38, pp. 963–971 (1991), the disclosure of which is incorporated by reference herein.

Product, or purified solute, can be removed at liquid withdrawal ports 24, 24', 24", etc. which are placed along the column length. In preferred embodiments, liquid withdrawal rates are preferably less than about 5% of the liquid flow rate so that the pH gradient is not perturbed. A UV spectrometer or High performance liquid chromatography system (not shown) can be employed to analyze the product, if desired.

Although the embodiment described hereinabove is in the form of a conventional cylindrical column, other bed configurations are within the contemplation of the invention. In an alternative embodiment, thin rectangular beds can be fabricated by spacing two glass sheets a set distance apart (e.g., 100–2000μm) and sealing the edges.

Figure 2A:
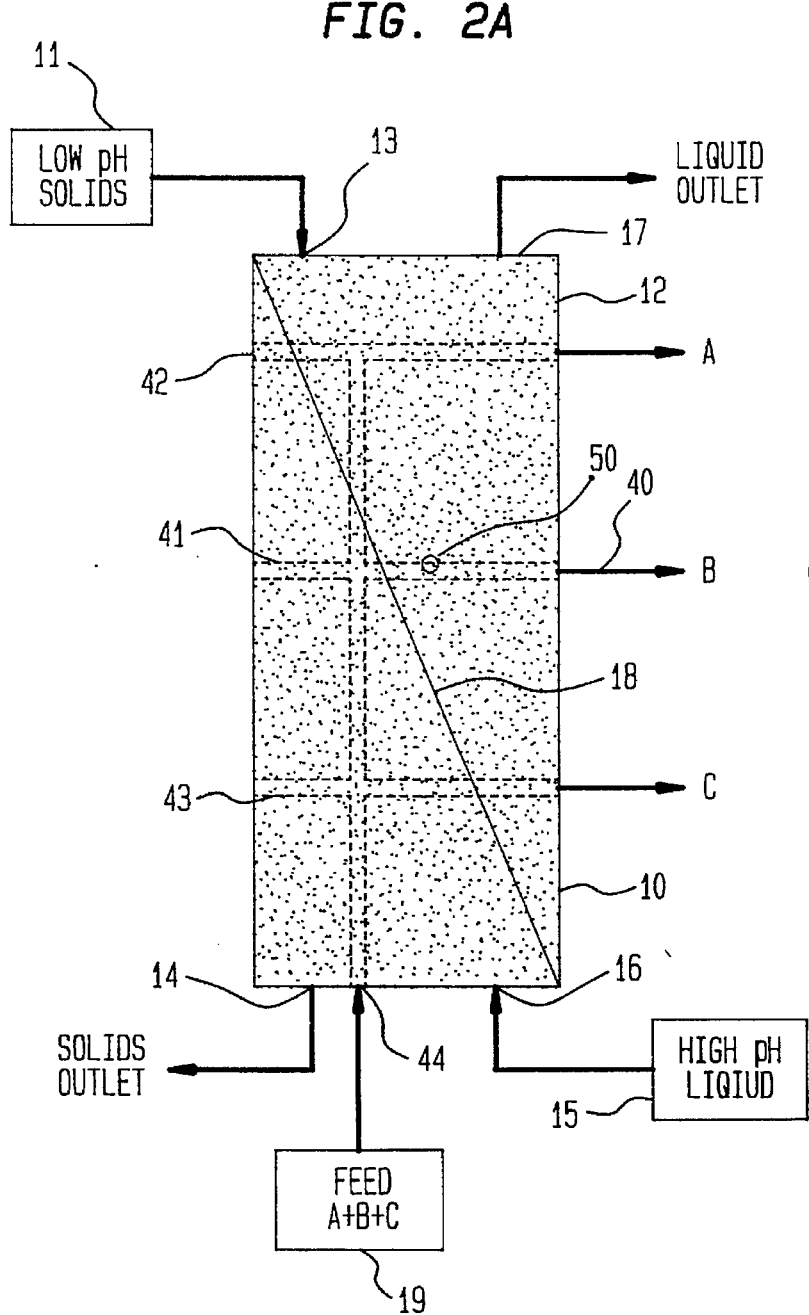
FIG. 2 is a schematic representation of an MSFB operated in accordance with the principles of the invention.
Figure 2B:
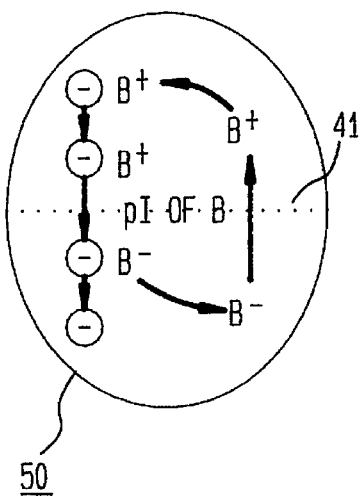

FIG. 2 is a schematic representation which illustrates the operation of an MSFB 10 in accordance with the principles of the invention. In an illustrative embodiment, solid support 11, as a liquid slurry at a low pH, are introduced into column 12 at the top of the column at solids inlet 13 and continuously withdrawn from the bottom of column 12 at solids outlet 14. A high pH liquid buffer 15 is introduced into the bottom of column 12 at buffer inlet 16 and flows upward through the column and is withdrawn at buffer outlet 17. If the MSFB is operated at steady state, a pH gradient will form in the column that remains spatially fixed. The pH gradient is illustratively linear as shown by line 18. By adjusting the concentration, pH, and flow rates of the two streams, pH gradients which are non-linear or segmented can be formed. In fact, custom tailored pH gradients can provide precise control over solute focusing in the column and allow the entire column to be used efficiently. Multiple aqueous-phase buffers can also be used to create complex pH gradients.

A feed solution 44, containing dissolved solutes A,B, and C are introduced into the left side of column 12 at feed inlet 19. For example, as solute B travels up the column, it becomes positively charged and adheres to the solid support. As the solid support travels downward, adsorbed solute B will be carried below its pI, at which point it will be released from the solid support. When it is released from the solid support, it will travel upward with the fluids. This cycling, as illustrated on inset 50, can continue indefinitely resulting in concentration of solute B at its pI point 41. Product, i.e., solute B, can be drawn off by withdrawal through sidestream product outlet 40 at the right side of column 12. Similarly, solutes A and C will focus at their respective pI points 42 and 43. In this illustrative embodiment, the solutes move up the left side of the bed and do not contaminate the products streams due to the two-dimensional focusing behavior of the novel system.

The principle of solute focusing relies on the partitioning of the solute between the liquid and the solid phases. Unlike chromatographic techniques, however, the process of the present invention adjusts the binding equilibrium throughout the column by the imposed property gradient (i.e., the solution pH). The variation in binding equilibrium causes a concentrating or focusing effect that works against the disruptive diffusive or dispersive forces in the bed and results in producing concentrations of solutes (products) which are many times their original values.

Focusing of solutes is not limited to ionic interactions, but can be based on many other interactions, including hydrophobic effects or affinity binding, provided that a time-invariant column gradient is maintained that affects interaction of the solute and the solid phase. In some embodiments, the solutes can be focused at points other than their isoelectric points by adjusting the value of K, a modified dissociation constant, to be equal to 1 at the desired location. Thus, focusing is possible in non-polar solutions.

Figure 3:
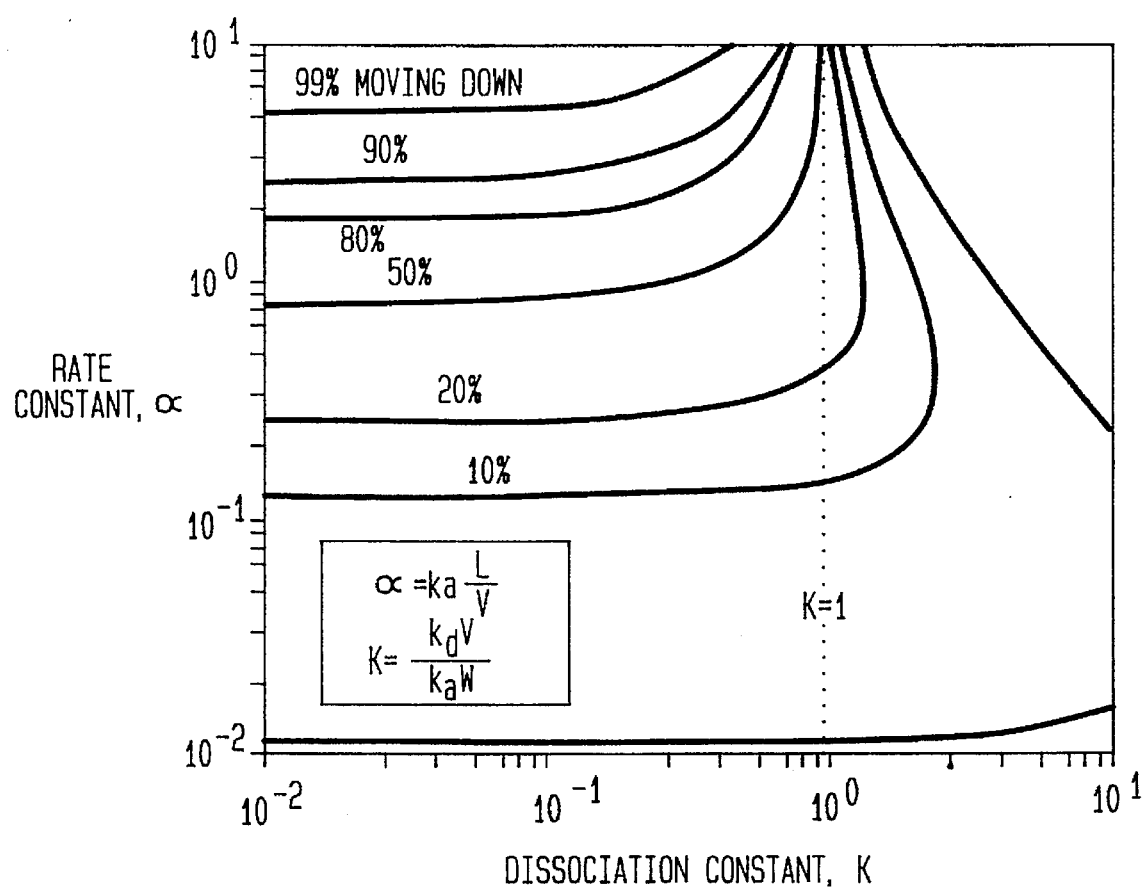
FIG. 3 is a graphical plot of the fraction of solute moving down an MSFB column with the solid phase as a function of a rate constant, a, plotted against a dissociation constant, K.

FIG. 3 is a graphical plot of the fraction of solute moving down an MSFB column with the solid phase as a function of two parameters, a rate constant, $\alpha$, and the modified dissociation constant, K. The equations for $\alpha$ and K are:

$$\alpha = k_a(L/V)$$

$$K = (k_d V)/(k_a W)$$

where $k_a$ is the forward rate constant for binding, $k_d$ is the reverse rate constant, L is the column length, V is the liquid flow rate, and W is the solid flow rate.

At large $\alpha$ (a typical value of $\alpha$ for stabilized beds is >10), the movement of solute in the column is controlled completely by K. For low values of K, the solute will partition to the solid phase and travel down the column. For values of K which are much greater than 1, the solute will partition to the liquid phase and travel up the column. Referring again to FIG. 3, at large $\alpha$, the lines converge on the value of K=1.

The MSFB of the present invention has the capability of focusing dissolved solutes and suspended particulates, such as cells. Cells, of course, generally do not have pI values near the physiological pH, and therefore, an attempt to focus cells at their pI values could damage the cells. Thus, focusing the cells at the point where K=1, i.e., where the partitioning of the cells between the liquid and the solid phase causes no net movement of the cells, is preferred.

In another embodiment of the invention, the character of the ion-exchange resin, for example, can change in response to the condition gradient imposed on the column. This embodiment can be adapted advantageously to the separation of cells. The resin can be chemically modified, such as by adding carboxylic or amine functional groups, so that the charge of the resin changes from positive to negative in response to pH. For example, a carboxylic group will be negative at high pH and neutral at low whereas an amine group will be positive at low pH and neutral at high. Therefore, as the solid phase travels through the stationary pH gradient, the charge on the resin will change. Thus, if the cells, for example, are attracted to the resin when it is positively charged, they will be released when the resin becomes negatively charged and travel in the opposite direction with the liquid phase flow. This will result in a focusing of the cells at the pI of the resin.

To further illustrate the principles of the invention, a mathematical model for the pH gradient can be formed by solving the mass balance and equilibrium equations for the column. The mass balance equation for the liquid phase, is:

$$\partial c/\partial t = E_l(\partial^2 c/\partial z^2) - (v_l/\epsilon)(\partial c/\partial z) - r$$

where c is the concentration of hydrogen ions in the liquid phase, $E_l$ is the liquid dispersion coefficient, z is the vertical position in the column, $V_l$ is the liquid superficial velocity, $\epsilon$ is the void fraction, and r is the rate of disappearance/appearance of hydrogen ion due to transfer between phases and complexation with either the aqueous or solids buffer.

A similar mass balance equation for the solid phase is:

$$\partial n/\partial t = E_s(\partial^2 n/\partial z^2) - (v_s/\epsilon)(\partial n/\partial z) + r$$

where n is the concentration of hydrogen ions in the solid phase, $E_s$ is the solid dispersion coefficient, and $V_s$ is the solid superficial velocity.

These equations, in conjunction with the appropriate equation for r (film mass transfer, pore diffusion, surface reaction, buffer complexation, etc.) depending on column conditions, can be solved to determine the pH gradient in the column.

Assuming that there is no mass transfer resistance between phases (i.e., r is infinitely fast) and no buffering capacity in either stream, then the, solute merely partitions between the liquid phase and the solids phase at each point in the column with a constant partition coefficient. At steady state, the mass balance equations reduce to a simple mixing of two countercurrent streams and can be solved by assuming that a series of equilibrium states account for the liquid dispersion.

Figure 4:
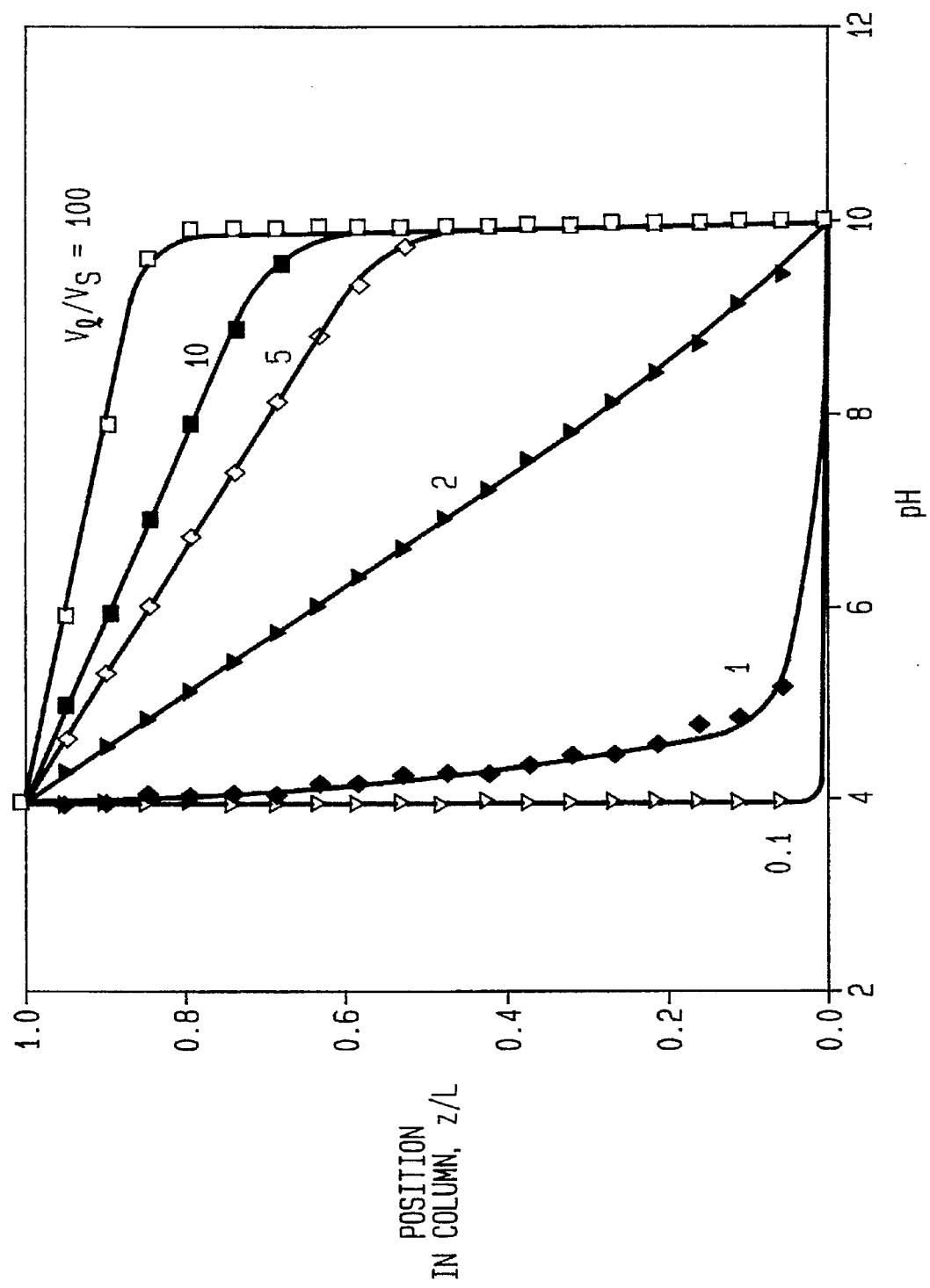
FIG. 4 is a plot of dimensionless position in the column (z/L) versus pH as a function of various liquid to solid flow-rate ratios ($V_f/V_s$)

From tracer dye studies, we have found that the dispersive nature of a stabilized bed under typical operating conditions can be represented by about 1.6 stages/cm. FIG. 4 is a graphical depiction of the solution to the model equations for a 20 stage column (about 12 cm). More specifically, FIG. 4 is a plot of dimensionless position in the column (z/L) versus pH as a function of various liquid to solid flow-rate ratios ($V_l/V_s$).

In this specific embodiment, the solids which are introduced at the top of the column have a pH of 4 and the liquid which is introduced at the bottom has a pH of 10. Referring to FIG. 4, a linear pH gradient is obtained by setting the liquid to solid flow-rate ratio at an intermediate value. Increasing the liquid to solid flow-rate ratio shifts the pH in the column towards the entering liquid pH and produces two regions in the column: a linear gradient region and a constant pH region. Decreasing the liquid to solid flow-rate ratio produces shallower, approximately linear pH gradients until a constant pH in the column equal to the pH of the solid phase is obtained.

Figure 5:
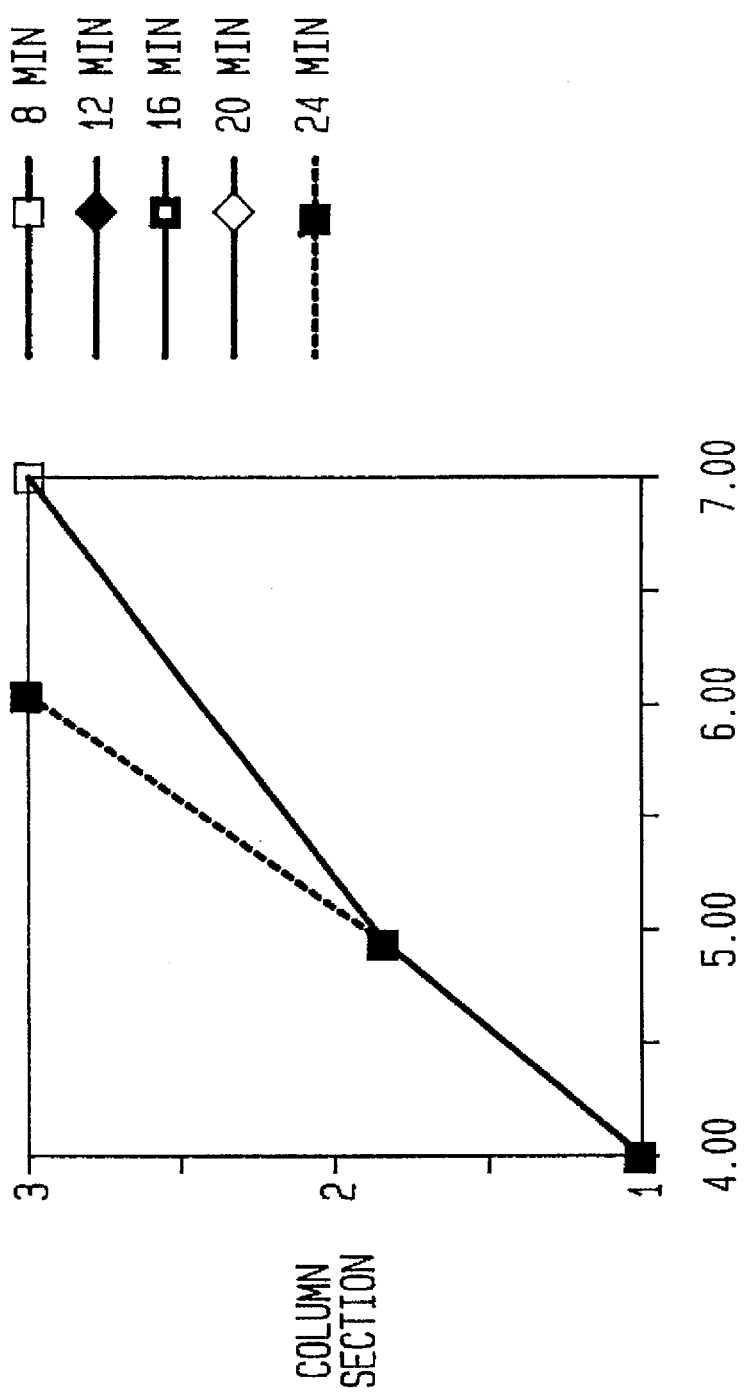
FIG. 5 is a graphical representation of pH in the column as a function of position in a specific illustrative embodiment of the present invention.

In a specific illustrative embodiment, an MSFB of the type shown in FIG. 1 was constructed. Amberlite IRC-50, a cation exchange resin (about 500 μm; Rohm and Haas, Philadelphia, Pa.), and nickel spheres (100–150 μm, available from Aesar, *) were used as the solid support in a ratio of 40% resin to 60% nickel. The MSFB was stabilized by a uniform magnetic field of 50 gauss. The pH of the solid support media, which was continuously introduced into the column, was 7.0. The liquid buffer ($KHC_8H_4O_4$) pH was 4.0. The pH in the column (8 cm) was recorded by measuring the pH of liquid withdrawn at various locations. FIG. 5 is a graphical representation of pH in the column as a function of position. The interval between each time point is 4 minutes.

The device of the present invention can be used to continuously focus and concentrate dissolved solutes, such as proteins, amino acids, and other biochemicals, or particulates, such as whole cells, cell debris, viruses and other particles. The device has applications in the biochemical processing industry for the recovery of microbial products from fermentation broths, in the biomedical instrument fields for processing whole blood and blood products, and in a number of other fields in which solutions containing suspended solids must be processed.

For large scale commercial applications, it is estimated that for a 30 cm diameter column 3 m long, the cost to generate the magnetic field (about 10 watts/l) would be minimal. A device of this size could process approximately 42 g of protein per minute (about 200 mg protein per min per liter).

In a specific illustrative embodiment, myoglobin, an exemplary protein solute having a pI of 7.1, was processed in accordance with the invention on a 16 cm column of nickel spheres (100–150μm) and Amberlite® IRC-50 ion-exchange resin. The ion-exchange resin comprised 40% by volume of the solid phase components.

The solid phase components were at a pH of 4.0 and the liquid buffer (potassium phosphate) was at a pH of 11.0. Liquid velocity was about 20 cm/min. The solids, traveling countercurrent to the liquid buffer, had a velocity of about 5 cm/min.

Figure 6:
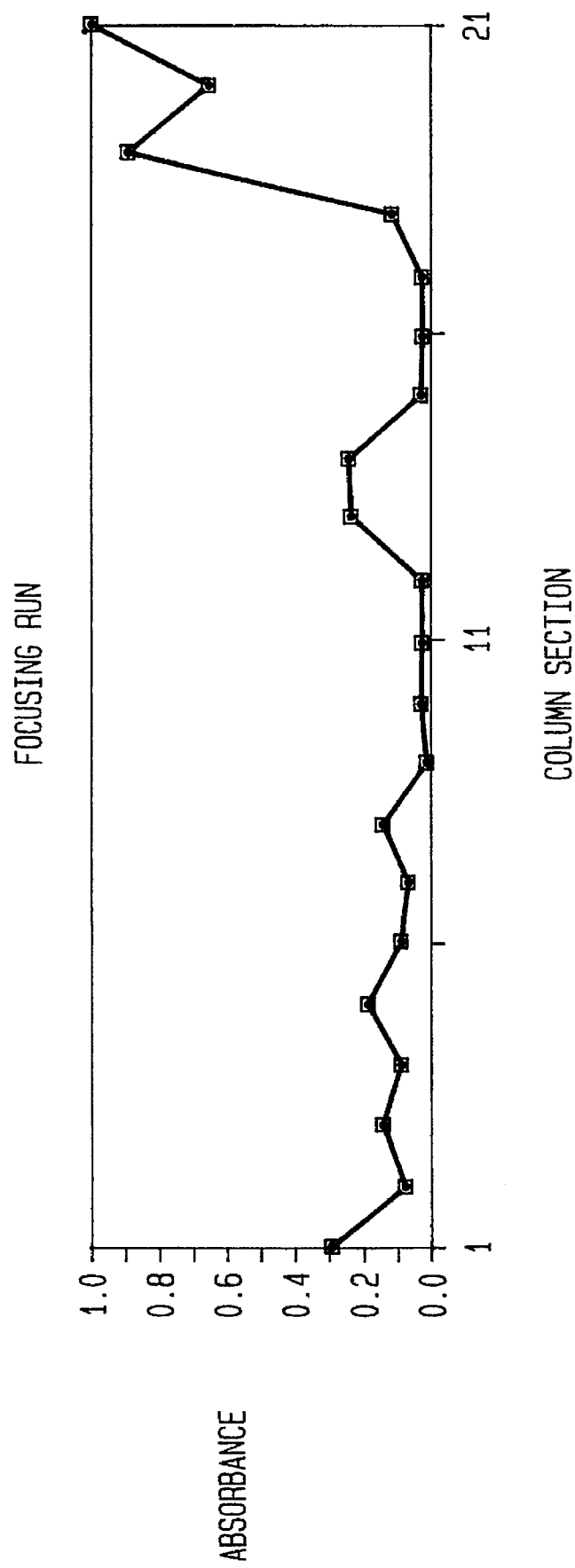
FIG. 6 is a graphical representation of absorbance readings as a function of column length demonstrating separation and concentration of myoglobin at its pI point in the column in accordance with the principles of the invention.

Referring to FIG. 6, the column was divided into 0.8 cm sections. Absorbance readings were taken at 280 and 500 nm. The absorbance readings are plotted as a function of the column section. Focusing of myoglobin is observed between sections 12 to 15.

Although the examples herein are given in terms of pH gradients, there are many different gradients and chemical interactions which can be used to focus solutes. Illustratively temperature (one stream is hot and the other cold) or ion concentration (one stream contains the ion, the other a compound that precipitates the ion). Other condition variables can be used to form a gradient provided that equilibrium partition between the phases is a function of the condition variable.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A process for separating at least one component of a multicomponent feedstream on a magnetically stabilized fluidized bed, the process comprising the steps of:

a. providing in a column having a predetermined length, a bed of magnetizable adsorbent solids for which the at least one component of the multicomponent feed stream has an affinity, the magnetizable adsorbent solids comprising a solid phase within the column which travels countercurrently to a flow of a fluid through a fluidizing medium in a predetermined flow portion of the column, the column having a first location where the multicomponent feed stream is introduced into the column, and a second location, distal from the first location, where the magnetizable adsorbent solids are introduced into the column, the predetermined flow portion of the column being disposed intermediate of the first and second locations of the column;

b. stabilizing the bed by a magnetic means of sufficient strength to suppress solids backmixing and to preserve staging therein;

c. introducing the multicomponent feedstream into the column with the fluidizing medium at the first location on the column;

d. introducing the magnetizable adsorbent solids into the column with the fluidizing medium at the second location on the column;

e. providing a gradient of a process condition of the type which affects the affinity of the at least one component to the adsorbent solids, the gradient of a process condition being maintained in a time-invariant fixed spatial relationship over the length of the predetermined flow portion of the column during operation thereby resulting in concentration of the at least one component at a predeterminable fixed component concentration location along the predetermined flow portion of the column corresponding substantially to the point of separation in the vicinity wherein a change in the binding affinity of the solute for the adsorbent solids occurs; and f. removing the concentrated component from the column at the predeterminable fixed component concentration location.

2. The process of claim 1 wherein the magnetizable adsorbent solids is a mixture of inert magnetically susceptible particles and non-magnetic chemically active resin.

3. The process of claim 2 wherein the mixture of magnetically susceptible particles and non-magnetic resin are in a ratio of 50% to 75% magnetically susceptible particles to 25% to 50% non-magnetic resin.

4. The process of claim 3 wherein the magnetically susceptible particles are selected from the group consisting of nickel, cobalt, iron, or stainless steel spheres of a diameter ranging from 50–200 μm and the chemically active non-magnetic resin is an ion-exchange resin ranging in diameter from 100–500 μm.

5. The process of claim 4 wherein the step of stabilizing the bed comprises subjecting the bed to a magnetic field on the order of 20–100 gauss.

6. The process of claim 1 wherein the step of providing a gradient of a process condition comprises the steps of providing the solid phase to the column with a first process condition and providing the fluidizing medium to the column at a second process condition.

7. The process of claim 6 wherein the first and second process conditions are selected from the group consisting of pH, temperature, salt concentration, and pressure.

8. A process for separating at least one component of a multi-component feedstream on a magnetically stabilized fluidized bed, the process comprising the steps of:

a. providing within a predetermined portion of a column a fluidized bed of adsorbent solids for which the at least one component has an affinity, the adsorbent solids having magnetizable components and comprising a solid phase in a slurry having a first pH within the column, the solid phase traveling within the predetermined portion of the column countercurrently to a flow through the predetermined portion of the column of a fluidizing medium which has a second pH, the first pH and the second pH being different from one another;

b. stabilizing the fluidized bed by a magnetic means of sufficient strength to suppress backmixing of the adsorbent solids and to preserve staging the rein;

c. introducing the multicomponent feedstream into the column with the fluidizing medium;

d. forming a pH gradient in the predetermined portion of the column which remains in a time-invariant, fixed spatial relationship over the length of the predetermined portion of the column during operation, such that the at least one component concentrates at a fixed location along the predetermined portion of the column corresponding substantially to the vicinity in the predetermined portion of the column where the pH in the gradient is equal to the isoelectric point of the at least one component; and separating the at least one component from the column at the fixed location along the predetermined portion of the column.

9. The process of claim 8 wherein the adsorbent solids is a mixture of inert magnetically susceptible particles and non-magnetic chemically active resin.

10. The process of claim 9 wherein the mixture of magnetically susceptible particles and non-magnetic resin are in a ratio of 50% to 75% magnetically susceptible particles to 25% to 50% non-magnetic resin.

11. The process of claim 10 wherein the magnetically susceptible particles are selected from the group consisting of nickel, cobalt, iron, or stainless steel spheres of a diameter ranging from 50–200 μm and the chemically active non-magnetic resin is an ion-exchange resin ranging in diameter from 100–500 μm.

12. The process of claim 8 wherein the step of stabilizing the bed comprises subjecting the bed to a magnetic field on the order of 20–100 gauss.

* * * * *